June 9, 1959 — M. R. CURRIE — 2,890,421

MICROWAVE CAVITY FILTER

Filed Feb. 26, 1953 — 2 Sheets-Sheet 1

INVENTOR.
MALCOLM R. CURRIE
BY
Lippincott & Smith
Attorneys

June 9, 1959 M. R. CURRIE 2,890,421

MICROWAVE CAVITY FILTER

Filed Feb. 26, 1953 2 Sheets-Sheet 2

INVENTOR.
MALCOLM R. CURRIE
BY
Lippincott + Smith
Attorneys 2,890,421

MICROWAVE CAVITY FILTER

Malcolm R. Currie, Albany, Calif., assignor to The Regents of The University of California, Berkeley, Calif., a corporation of California Application February 26, 1953, Serial No. 339,005
4 Claims. (Cl. 333—73)

This invention relates to electric wave filters particularly adapted to transmit a narrow band of frequencies in the microwave region and attenuate strongly frequencies outside of this band.

It is well known that band-pass electric wave filter comprise essentially a plurality of parallel resonant circuits, coupled in cascade and inserted between input and output transmission lines. Filters for use in the lower frequency bands customarily comprise lumped-constant circuits of this character coupled in various ways. For frequencies in the microwave range, however, lumped-constant circuits become impractical for various reasons; among them the fact that the circuit elements necessary to give the values of inductance and capacitance required are so large in comparison with the wave lengths at these frequencies that material radiation of power from such elements is unavoidable, with consequent losses and interference with neighboring apparatus. Therefore, transmission lines for use at these frequencies usually take the form either of wave guides or coaxial cables and resonant circuits employing lumped constants are replaced by tuned sections of such wave guides or by cavity resonators.

A cavity resonator, when excited at a frequency to which it will resonate, has the impedance characteristic of a resonant circuit which may be either series- or parallel-resonant, depending upon the frequency and upon the method of its coupling to the transmission line feeding it. Accordingly, filters for frequencies in the microwave range have frequently been constructed of a succession of cavities, having resonances within the desired range, coupled together in cascade.

It is also well understood that a cavity resonator will respond to an infinite number of resonant frequencies; i.e., it will oscillate in an infinite number of modes. Where the cavity is symmetrical certain of these modes are "degenerate," which means that although the direction of electric fields, the magnetic fields or both, established by the respective modes may be different, the frequency of oscillation at each mode will be the same. A spherical cavity, being symmetrical about any axis which may be chosen, will respond to a given frequency of excitation in an infinite number of degenerate modes. In a perfectly spherical cavity, without any asymmetries whatsoever, these degenerate modes can exist quite separately and without interference to each other. Such a cavity, however, would have no practical use, since any practical means of feeding energy into the cavity must of necessity destroy the symmetry to a certain extent and cause some "perturbation" in the otherwise perfectly symmetrical electric or magnetic fields set up therein. By a proper choice of coupling mechanism, however, these perturbations may be made small and the cavity may be treated, to a first approximation at least, as though it were perfectly symmetrical, so far as the frequency of response is concerned.

When a wave guide or other type of transmission line is coupled to a cavity of this type and energy is supplied thereto at a frequency to which the cavity will resonate matters may be adjusted so that the response of the cavity will be limited to a single mode of oscillation. Thus, for example, it is known that a rectangular wave guide having one cross sectional dimension smaller than the other and fed with frequencies adjacent its low-frequency cut-off will transmit energy only in its $TE_{10}$ mode. Within its pass band the magnetic field will be in the direction of its longer dimension and the electric field in the direction of its smaller dimension. If such a wave guide be coupled to the cavity, as, for example, by an iris, the mode of oscillation set up within the cavity will be such that the fields within the latter are colinear with the respective fields in the wave guide. If no other perturbations of the fields within the cavity exist, it will oscillate in accordance with a single mode. A similar wave guide, coupled into the cavity through an iris at the opposite pole of the sphere, and with the longer dimension of its cross-section alined with that of the first wave guide will pick up energy from the cavity and transmit it. If, however, the second wave guide is rotated around the polar axis so that the longer dimension of its cross-section is orthogonal with respect to that of the input guide, it will pick up no energy from the cavity since it cannot support an oscillation wherein the magnetic field is in the direction of the shorter dimension. As an input line it can, of course, transmit energy into the cavity, exciting the latter in a mode which is degenerate with respect to the one established by the wave guide first postulated. The two degenerate modes therefore can exist within the cavity quite independently and without intercoupling between them.

If, now, a small perturbation is introduced within the cavity at a suitable point, the two otherwise independent modes can be coupled so that energy is transferred from the first of the two degenerate modes into the second. A perturbation thus introduced may take any of a number of forms. Thus, it may be a dent in the wall of the cavity, a probe projecting into the cavity from the wall, or a small mass of conductor suspended within the cavity itself, as by an insulating thread. Of these methods of producing perturbation on the fields a probe, for obvious practical reasons, is the most feasible. The location of the probe, with respect to the field from which energy is to be transferred, will determine the degenerate mode which it excites. Thus a probe inserted at a point where there is a finite electric field and the magnetic field vanishes will establish a coupling between two modes which is essentially a capacitive coupling, and will excite the cavity to a degenerate mode such that the electric fields are colinear but the magnetic fields are mutually disoriented. If the probe be inserted at a point where the electric field vanishes but a magnetic field exists, an inductive coupling will be established having a magnetic field colinear with that from which the energy is withdrawn. In each of these cases, it will be noted that the coupling fields are colinear while the fields of the opposite type are disoriented, in general, by $\pi/2$ radians or 90°.

Since there are, as has been stated, an infinite number of degenerate modes, it is obvious that by establishing a second perturbation within the cavity a third degenerate mode may be excited, and so on. From what has been said with regard to filters, it will be recognized that a single cavity, oscillating simultaneously in three degenerate modes, established by consecutive couplings is the equivalent of three coupled parallel resonant circuits in cascade. For use as a filter, however, it is necessary usually (although not always, as will be later developed) that the modes which are excited be independent except for the couplings which are deliberately introduced and that therefore the perturbations which couple the first mode to the second should introduce no coupling between the first and the third. Furthermore, in the usual case the first and the intermediate modes must not be capable of transmitting energy into the output transmission lines. In order that this may be the case, the excited modes must be mutually perpendicular with respect to at least one field component, and since, as the coupled fields of the successively excited modes must be colinear at the point where coupling of this type exists, this limits the usable modes, in a spherical cavity, to three, which makes the filter which could be realized by the expedients thus far described be equivalent to a three stage filter.

Probe coupling of this type has been used in cavity resonators for various purposes in the past. This invention is particularly concerned with the introduction of perturbations of an entirely different kind, i.e., couplings which instead of requiring colinear fields are effective in coupling magnetic fields of any orientation. This is accomplished by inserting in the cavity and projecting from its walls one or more small loops of conducting material, "small" being here defined as being of small diameter in comparison to the dimensions of the cavity. A coupling loop of this kind is preferably located at a position where the electric field vanishes, which coincides with a magnetic field maximum measured around the cavity in one plane which includes the coupling loop. If the plane of the loop is such as to be inclined at an angle of less than 90° with the direction of the magnetic field already established it will serve to set up a mode of oscillation wherein the magnetic field is at right angles to that of the field from which energy is being withdrawn. The degree of coupling between the two modes of oscillation depends upon the angle between the plane of the coupling loop and the direction of the magnetic fields of the two coupled modes. If the plane of the loop is parallel to the field from which the energy is withdrawn the coefficient of coupling with the orthogonal degenerate mode will be zero; if the angle made with both fields is $\pi/4$ radians, the coupling between the two will be a maximum, and by varying the angle of the loop with respect to the fields in either direction from the 45 degree position the coupling can be varied between zero and the maximum values. If the plane of the loop be normal to a magnetic field component, it can establish a colinear-field mode of the same type as would be established by a probe in like position.

Considering for the moment only the spherical type of cavity which has been chosen for illustration, the use of this loop type of coupling between degenerate modes makes available two additional modes which can be coupled in cascade, thus making available a five-stage filter in a single cavity, and hence providing in a single cavity the greater attenuation outside of the pass bands and greater sharpness of cut-off that is characteristic of multistage filters. This has the obvious advantages, over a plurality of mutually coupled cavities, of light weight, low cost and minimum space required. Further, when this type of coupling is used some unusual filter configurations (in terms of equivalent circuits) may be achieved; thus it is possible to provide, in addition to the cascaded stages that have already been referred to, an additional and completely adjustable amount of coupling between the input and output stages. This permits variations in band widths, at the expense, of course, of some desirable attenuation in the cut-off band.

There are several points to be noted in connection with the degenerate modes of oscillation and their coupling. First, the perturbations of the fields within the cavity inevitably alter its complete symmetry and to a certain degree destroy the degeneracy of the modes which they couple, making the frequency of oscillation slightly different from what it would be in the undisturbed cavity. If, however, the perturbations are small, the deviations in resonant frequency from that of the undisturbed cavity will also be very small and can be computed and compensated for in the cavity design. Another reason for limiting the perturbations to a small value is that if they become large they may set up additional spurious modes of oscillation within the cavity, which, in general, will not be completely independent and which will therefore introduce uncontrolled degrees of cross-coupling. The effect of such cross-couplings is to make the band width uncertain and to decrease the attenuation outside of the pass band desired.

Still another important fact to be kept in mind is that the maximum number of cascaded degenerate modes can be realized if both the probe type of coupling utilized with colinear fields and the inductive loop coupling which is the particular feature of this invention are combined.

The nature of the invention, considered from a practical viewpoint, will best be appreciated from the descriptions of certain preferred embodiments thereof which follow, taken in connection with the accompanying drawings wherein.

Figure 1:
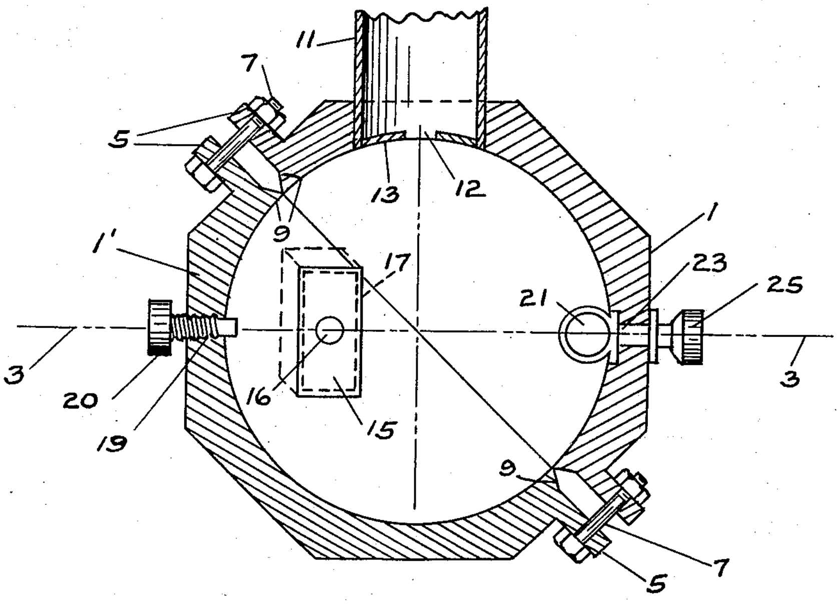
Fig. 1 is a central sectional view of a spherical cavity resonator embodying this invention.

Considering now Fig. 1, the structure of the cavity resonator itself is there indicated in central cross-section. The resonator is formed of two blocks of metal, 1 and 1'. As is well understood, in connection cavity resonators generally, the resonator (or at least the internal surface of the cavity) should have the lowest obtainable resistivity. This consideration would lead to the choice of copper or silver as the preferable material from which to construct it. It may, however, for purely mechanical reasons, be desirable to form a cavity of brass or other material which would be less desirable from an electrical standpoint than the copper or silver, in which case the inner surface of the cavity formed within the resonator may be plated with silver or copper. At the high frequencies for which the use of such devices as that here described is most desirable, the skin effect is such that the penetration of the currents below the surface becomes a matter of a few thousandths of an inch at most, and therefore an interiorly plated resonator may be just as satisfactory as one formed entirely of the better conductor. For simplicity of showing, however, it will be assumed that the material of the resonator is solid copper.

The external form of the resonator is without significance. The particular cavity illustrated comprises two blocks, circular around the axis 3. These blocks are provided with flanges 5, drilled for a plurality of bolts 7, by means of which the two halves of the resonator are tightly held together. An accurately hemispherical cavity is formed within each of the blocks, the edge of each cavity terminating in a blunt knife-edge, as indicated by the reference characters 9. When the half-cavities are tightly bolted together these knife-edges are just sufficiently deformable to make a substantially perfect electrical contact around the rim where the cavities join, without extruding to form a perceptible ridge within the cavity.

A transmission line 11 couples into the cavity at the top of the figure. This line is in the form of a rectangular wave guide which is designed so that it will cut off at frequencies such that the lowest frequencies it will transmit are in the neighborhood of the frequency band upon which the filter is intended to operate. Transmission lines of this character are designated as operating in the "$TE_{10}$" mode. When transmitting the frequencies the guide is designed to carry in this mode the magnetic field can exist only in the direction of the longer dimension of the cross section of the guide. The electric field is at right angles to this dimension.

The wave guide 11 fits snugly into an aperture formed to receive it within the block 1. The guide is terminated in an iris 12, formed in a diaphragm curved to the same radii (in the two dimensions) as the interior of the cavity whereby the diaphragm creates no material discontinuity in the wall of the sphere. The degree of coupling between the guide and the sphere and the impedance match between the two circuit elements formed thereby are determined by the size of the iris, in accordance with well known principles.

Considering the transmission line 11 as the input line, the output line it is of precisely of the same character and is coupled into the spherical cavity in the same manner. It will be recognized that the designation of either transmission line or "input" or "output" is purely arbitrary, as functionally the device is symmetrical and the function of the two lines can be interchanged without affecting the operation in any degree.

The output diaphragm 15 with its iris 16 are indicated in the figure, the output wave guide into which it feeds being merely indicated by the dotted line at 17 showing the end of the guide.

At the left of the figure there is indicated an adjustable probe 19, forming the end of a screw 20 threaded through the wall of the cavity. Opposite the probe 19 is a loop 21 of fine wire, secured to the end of a rotatable shaft 23, which passes through the wall of the resonator, the azimuth of the loop being adjustable externally of the cavity by means of a knob 25.

Figure 3:
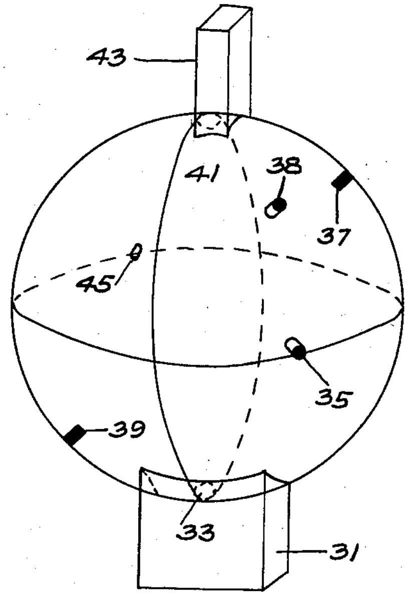
Fig. 3 is a similar diagram showing the position of coupling devices which would produce the equivalent of a five stage filter with additional variable coupling between the first and the last stages.

In the particular conformation that has been chosen for first description, the elements thus described are all that would be visable from the aspect shown. Due to the symmetry of the cavity and the very large number of degenerate modes which it will support there are many places in which probes and loops of the type illustrated could be inserted. The relative locations of the various couplings into and out of the resonator cavity and the couplings between the degenerate modes within it can better be appreciated by means of a system of spherical coordinates to which the position of the elements mentioned are referred. Such a system of coordinates is shown in Fig. 3 in isometric projection and the same coupling devices are indicated thereon diagrammatically, those also shown in Fig. 1 carrying the same reference characters; coupling elements not pictorially represented in the first figure will be identified as they and their functions are mentioned in the further description.

In the coordinate system mentioned the position of the transmission line arbitrarily selected as the "input" line is taken as one pole of a sphere with the origin at the center. Positions on the surface of the sphere are designated in terms of the angles $\phi$ and $\theta$, designating latitude and longitude respectively. $\theta$ varies from zero at the pole, where the input line enters, to $\pi$ or 180° at the opposite pole, the two coupling devices 19 and 21 being located at the latitude of the equator or $\theta=\pi/2$ radians. Longitudinal angles are measured in terms of the angle $\phi$, measured from 0 at the nearer side of the sphere and varying from 0 to $2\pi$ or 360°, the coupling device 21 being located at the longitude $\phi=\pi/2$ while the probe 19 is at longitude $\phi=3\pi/2$. The iris 16 of the output line has the coordinates $\phi=5\pi/4$, $\theta=\pi/2$. In general the angles $\phi$ and $\theta$ will be designated in radians hereinafter.

The third coordinate of this system is the radius $r$. All of the material elements of the device have to coordinate $r=a$, the radius of the cavity as a whole.

In a cavity of the type herein discussed two distinct series of degenerate modes may be set up. These modes, in accordance with one presently accepted terminology, are designated as "TE" and "TM" modes respectively. The frequencies which the cavity will sustain differ with respect to these two classes of modes, the fundamental or lowest frequency to which the cavity will resonate at a TE mode being approximately 1.636 times the lowest TM frequency. It follows that if the cavity is fed with a frequency which will establish TE modes, all of the degenerate modes of the same frequency will also be TE modes. The same holds for TM modes. With respect to a spherical resonator a TE mode is one in which the electric field has no radial components, while a TM mode is one wherein the magnetic field has no radial components.

Referring the modes to the coordinate system with the input transmission line at $\theta=0$, the various modes are described by subscripts which may be considered as representing, in turn, the number of half wave-lengths within the cavity in the different coordinate dimensions, $r$, $\phi$ and $\theta$ in that order. It should be remembered, however, that while this statement is generally true as to at least one field component of the mode so designated it is not necessarily true of all field components. Strictly speaking the subscripts indicate the order of the mathematical functions which define the fields; for the derivation of these functions reference is made to "Wave Guide Handbook" by N. Marcovitz, vol. 10, M. I. T. Radiation Laboratory Series, McGraw-Hill, 1951. For the purposes of this description, however, the "half-wave-length" concept leads to no inaccuracies and gives a clearer physical picture than the mathematical treatment. The mode $TM^e_{112}$ which the configuration illustrated in Fig. 1 will be set up as a first degenerate mode when fed from the input transmission line, may be considered as having one half-wave-length of the electric field in the radial direction (since the magnetic field can have no radial components), 2 half-wave-lengths of a magnetic field component from the input iris around to the opposite pole at $\theta=\pi$, one half-wave-length across the cavity at equator. This over simplification of the actual state of affairs is useful in visualizing the relationships between the various coupling devices; these must be placed where they will affect only modes between which coupling is desired and will not set up spurious modes, as will be hereinafter set forth. The superscript "$e$" in the designation $TM^e_{112}$ of the initial mode indicates an "even" mode. A corresponding "odd" mode, $TM^o_{112}$, has the same general field configuration, but the magnetic fields of this odd mode vanish at points displaced in longitude by $\pi/2$ radians from like points with respect to the even mode. At the input iris the magnetic fields are orthogonal, and therefor the odd mode cannot receive energy from the input guide since the latter cannot support a wave having a magnetic field in the direction of its shorter cross sectional dimension.

Figure 2:
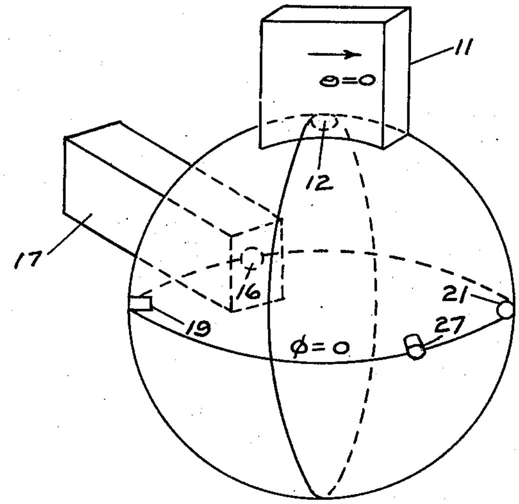
Fig. 2 is a diagram in isometric projection of a coordinate system applicable to the spherical cavity of Fig. 1, with the positions of coupling means for various modes and the position of input and output transmission lines indicated thereon, these being the couplings required to establish the five independent modes equivalent to a five stage filter.

In the embodiment of the invention illustrated in Figs. 1 and 2 the $TM^o_{112}$ mode is employed as the second degenerate mode of the cascade constituting the filter. These two modes are coupled by a probe 27 located at $\phi=\pi/4$, $\theta=\pi/2$. This probe is not visible in the showing of Fig. 1, but it may be identical in construction with the probe 19. The degree of coupling between the two modes is dependent upon the volume of the probe which projects from the cavity wall. As has already been indicated, too great a coupling tends to destroy the degeneracy and may set up undesired modes with cross-coupling. Since the coupling established is dependent upon the volume of the probe setting up the perturbation in the field, rather than upon the length or the cross-section of the probe considered individually, a convenient method of determining the proper effective volume is to make the portion of the probe which projects within the cavity adjustable as shown, and determine the proper adjustment empirically rather than by precomputation. Thus in one experimental cavity having an internal diameter of 1.790 inches and operating at a midband frequency of 9362 megacycles, a probe depth of .235 inch gave approximately correct coupling, the probe diameter being 0.125 inch. In this particular cavity it was found that excess depths of probe caused a material falling off of attenuation on the low-frequency side of the pass band.

The fields which are coupled by the probe 27 are the longitudinal magnetic components of the two related modes. A probe can couple co-linear fields only, and the fields of both modes must be finite at the point at which they are coupled-in general they will be equal at the point of coupling, at least to a close approximation. Therefore in using coupling probes the most effective position in setting up orthogonal modes is $\pi/4$ electrical radians (as distinguished from the physical angle within a spherical cavity) from the poles of the fields to be coupled. In the case of the two $TM_{112}$ modes the electrical and physical angles are equal.

From another aspect, the probe, which establishes the coupling between a pair of odd and even modes can be considered as setting up a single resultant mode with a maximum field at the position of the probe; the even and odd modes are then the two orthogonal components of the resultant mode.

The coupling between the $TM^{o}_{112}$ mode to the next degenerate mode is through the loop 21, which, positioned as shown couples the longitudinal magnetic field of the $TM^{o}_{112}$ to the mode $TM^{o}_{122}$. The coordinates of the loop position are $\phi=\pi/2$ and $\theta=\pi/2$, and the loop is oriented for best coupling with its plane at an angle of $\pi/4$ radians to the field produced by the $TM^{o}_{112}$ mode.

The diameter of the loop is the same general order of magnitude as the projection of probe into the cavity. Its volume, however, is much smaller than the volume of the probe and hence, while it is capable of coupling colinear electric fields whatever with respect thereto its plane its effect in coupling such electric fields is very small in comparison with that of a probe, because of its smaller volume. As a coupler for magnetic fields, however, its effect is dependent upon its inductance, and hence, generally upon the area within the loop rather than upon its volume. In contrast with the positioning of a coupling probe, however, to have its maximum desired effect in coupling orthogonal magnetic fields a loop should be located at a field maximum. From the "resultant" aspect, the plane of the resultant field will be normal to the plane of the coupling loop, and at the position of the loop, the coupled fields become the two orthogonal components thereof. Where a loop is used to couple colinear magnetic fields, however, its position in the cavity should be the same as that of a probe for coupling the same fields. The distinction between orthogonal fields and orthogonal modes should be noted; orthogonal modes may have colinear fields. The $TM^{o}_{122}$ mode being established by the loop 21, the position of the probe 27 is such that it will couple this latter mode with the mode $TM_{102}$. This coupling, however, is through the radial electric field the probe 27 being located at a point where the magnetic fields of all the other modes thus far considered vanish.

Note that the loop 21 is coupled with a $\phi$ or longitudinal magnetic field component and therefore the induced $TM^{o}_{122}$ magnetic field set up is in the $\theta$ or latitudinal direction. The $TM_{102}$ mode is of zero order in the $\phi$ direction, its radial electric field at the equator is uniform at all angles. The $TM_{122}$ modes have the order 2 in the $\phi$ direction, and hence the even mode, displaced $\pi/2$ radians electrically from the odd mode, is displaced $\pi/4$ radians spatially within the cavity. With the $TM_{102}$ mode established, a probe anywhere on the equator will tend to set up a mode of the $TM_{122}$ mode the probe should be an odd multiple of $\pi/4$ radians in longitude from the probe 27. This condition is met by the probe 19, at $\phi=3\pi/2$, $\theta=\pi/2$.

The magnetic field of the $TM^{e}_{122}$ mode at the equator is in the $\theta$ direction and is a maximum at angles displaced from the maximum electric field established by the probe 19 of odd multiples of $\pi/4$ radians. The output wave guide is therefore located at such a point, its coordinates being $\phi=5\pi/4$, $\theta=\pi/2$. Its iris is at a maximum of the magnetic field of the final mode; it is also at a maximum of the radial electric field of the $TM^{o}_{122}$ mode, but it will not transmit waves of the type such a field could establish. All fields of the other modes discussed vanish at this point, and hence the conditions for the purely cascaded couplings of modes from input to output are met. The device therefore acts as a 5 section filter.

It should at once be apparent that as a filter a cavity of this kind is essentially a narrow band device. That this must be so is evident from the fact that the coupling between the various modes must be small if the degeneracy relied upon to make the filter possible is not to be destroyed, for coupling devices of large size may set up higher order modes introducing cross couplings that are difficult to compute.

Very high degrees of attenuation can be obtained outside the pass band when the coupling is kept small; actual measurement of attenuation at these frequencies becomes difficult; with the test equipment available in one instance 55 db attenuation was the maximum which could be measured with any reasonable degree of accuracy, but with such equipment it was found that with couplings adjusted to the critical value for a 6 megacycle band a deviation of 10 megacycles per second above the mid-frequency (7 megacycles above theoretical cutoff) in a 3 mode filter gave an attenuation of 25 db, rising rapidly toward the maximum measurable. Employment of more "stages" through the use of additional modes further sharpens the cutoff, in the measurements mentioned the insertion loss within the pass band was only 2 db.

Figure 4:
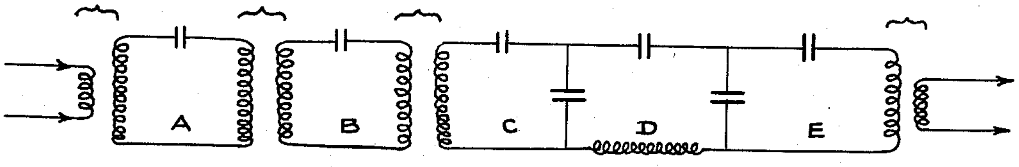
Fig. 4 is a schematic diagram of a lumped-constant filter substantially equivalent to that produced by the modes of oscillation in a spherical cavity having coupling means of the type shown in Fig. 2.

The diagram of Fig. 4 illustrates a lumped-constant circuit analog of the filter thus described. It will be noted that although the conformation of the various circuits representing the successive modes differs, each of these circuits is intended to represent one having constants which tune it to the same resonant frequency. The input circuit is coupled to section A by one magnetic field, and section A couples to section B by a distinct and separate magnetic field. Section B couples to section C magnetically, but sections C, D and E are coupled capacitively, the intercouplings being also by different electric fields. Section E couples to the output line by its magnetic field. As a filter conformation this is unusual, since in a filter using lumped inductances and capacitances the different values required would make it hard to construct, but it is a perfectly feasible conformation, even for lumped-constant filters.

Fig. 3 is a spherical coordinate diagram of a filter utilizing the same principles as those already described, but wherein the width of the pass-band is adjustable by means of the variable coupling between the input and the output modes. The mechanical construction of such a filter could be substantially identical with that of Fig. 1, the only difference being the relative locations within the cavity of the coupling devices for the input and output transmission lines and the inter-mode couplings. In the configuration diagrammed the positions of the various elements mentioned are applicable to a filter operating in accordance with TE modes of oscillation. The input line 31 is coupled to the spherical cavity through an iris 33, located at $\theta=\pi$. As in the case first described, the transmission line is designed to propagate $TE_{10}$ waves of the designed frequency, and is coupled to the sphere through its transverse magnetic field. The dimensions are such, however, that it establishes the $TE^{o}_{112}$ mode within the sphere instead of the TM modes used in the embodiment first described.

The other coupling devices illustrated are, in order, a loop coupler 35 at $\phi=0$, $\theta=\pi/4$, which establishes the $TE^{e}_{122}$ mode through its coupling with the input mode, a probe 37 at $\phi=\pi/2$, $\theta=\pi/4$ for coupling the $TE^{e}_{122}$ mode to a $TE_{102}$ mode, another probe 38 at $\phi=\pi/4$, $\theta=3\pi/4$, which couples the last-mentioned mode to the final $TE^{e}_{112}$ mode. This latter mode is coupled in turn to the output iris 41 at $\theta=0$, coupling the $TE^{e}_{112}$ mode to the $TE_{10}$ mode of an output wave guide 43.

With the same degrees of coupling between the various modes as were used in the embodiment first described, the couplings thus far enumerated would produce a filter having the same overall characteristics as that of the first embodiment, in spite of the fact that TE rather than TM modes are employed. In the two types of modes the various components of the fields vanish and reach their maxima at different locations within the sphere, and the coupling devices are accordingly located in different positions, but as long as the coupling coefficients between the modes were the same the characteristics of the two filters would be substantially identical.

In addition to the couplers which have been mentioned, however, there is provided in this second conformation a loop coupler 45 with the coordinates $\theta=\pi/2$, $\phi=3\pi/2$. This is a variable coupler and couples the first or input mode $TE^{o}_{112}$ to the output mode $TE^{e}_{112}$. The magnetic field components which may be coupled by this last-mentioned loop are the $\theta$ component of the input mode and the $\phi$ component of the output mode. To secure maximum coupling this loop would be set at an angle of $\pi/4$ to the coupled fields of both modes. If set with its plane parallel to either mode it would cause no coupling between them, and the coupling can be varied from zero to maximum by rotating the loop. Normally the amount of coupling so supplied would be made small. Its effect, as has already been mentioned, is to control the width of the band passed by the filter. If this coupling is made very loose, the plane of the coupling loop being very nearly, but not quite, parallel to one of the fields so coupled, its effect upon attenuation is much less than its effect upon the width of the band passed by the filter.

Figure 5:
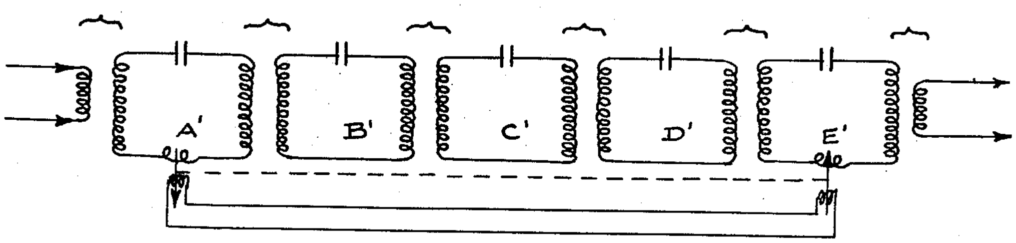
Fig. 5 is a diagram of the same character as Fig. 4 illustrating a lumped-constant circuit having substantially the characteristics of a spherical cavity resonator including the coupling means diagrammatically shown in Fig. 3.

In the embodiment last described the couplings are all through the magnetic fields of the various modes and therefore the lumped-constant analog of the filter would be substantially as shown in Fig. 5. In this showing the various sections of the filters are identical in type, as far as couplings are concerned, with the exception of the additional coupling between the input and the output stages, which is represented by a loop circuit 45′ to indicate its analogy with the coupling loop 45 of Fig. 3. Interstage couplings are indicated by the brackets, but the coupling with the loop circuit is indicated by arrows to symbolize that it is variable. As far as its effect is concerned, a showing of only one of the couplings as variable would suffice, but since in the cavity filter the couplings to the two modes cannot be varied independently, the coupling to one necessarily increasing while that to the other decreases, this situation has been indicated in the analog diagram by the arrows indicating variability being pointed in opposite directions, with a dotted line indicating the mechanical interconnection. When either coupling is zero the overall coupling is zero, and the maximum occurs when the couplings are equal.

A factor to be noted relative to the field configurations within the device of Fig. 3 is that since it is the magnetic fields which are coupled throughout, any of the probes can be replaced by a loop oriented in the proper plane. Since it is in each case co-linear fields which are coupled by the probes, the loops replacing these probes would lie with their planes normal to the fields to be coupled. Hence the first mode, $TE^{o}_{112}$, has the $\theta$ component of its magnetic field coupled by an oblique loop with the $\phi$ component of the $TE^{o}_{122}$ field of the second mode, and this would necessarily be a loop coupling. The coupling of the $TE^{o}_{122}$ mode and the $TE_{102}$ modes is through the $\theta$ components of both fields and hence the plane of a loop which might be substituted for the probe coupling shown would be in the meridial direction. The same holds true of the coupling loop which might replace the probe for connecting the $TE_{102}$ to the $TE^{e}_{122}$ mode, since it is again the $\theta$ component of the magnetic fields that are coupled. The final coupling is between the $\phi$ components of the $TE^{e}_{122}$ and $TE^{e}_{112}$ modes, and hence in this case the plane of the loop would be in the $\theta$ or equatorial plane.

The choice as to whether a loop or a probe should be used to couple magnetic fields is primarily one of ease of manufacture. It is highly essential that the contact between the probe and the wall of the sphere be of minimum resistance, since a point of maximum magnetic field adjacent to the cavity wall means, necessarily, a point of maximum current in the wall and a poor contact can involve large losses. Low resistance between a loop and the cavity wall is not so important, since the coupling could equally be achieved by a loop wholly insulated from the cavity wall. The resistance of the loop itself should, of course, be low, on general principles, but the net current in the loop is actually very small and not at all of the same order of magnitude as is the oscillating current flowing in the resonant cavity. Where the loop is adjustable, as in the case of the loop 45, or the loop as pictured in Fig. 1, careful machining is involved in order that the loop may be accurately rotatable in relation to the desired fields. The fixed loops, however, may be manufactured very simply, always bearing in mind, however, that irregularities left in the surface by the mechanical connections are undesirable and may cause unfavorable perturbations in the fields.

Because of the fact that the effective resistance of a properly designed cavity resonator is very low, and the effective Q of the cavity is consequently high, filters of the type here described approach more nearly the characteristics of an ideal filter than any that can feasibly be constructed of the coils and condensers employed at lower frequencies. Some $I^2R$ losses do, of course, exist, and they have the same general effect upon the pass band and overall characteristics that the inevitable losses in a lumped-constant filter will have, although relatively these effects are smaller. They can be computed in the same manner as in a lumped-constant filter; if therefore would appear unprofitable to discuss their effects in this description.

Spherical cavities have been selected for the description of the invention for several reasons; first, because of the large number of degenerate modes which are possible within them, second, because the number of completely independent modes which they will support and which can be coupled by the more familiar probe expedient is limited to three, and the advantages to be gained in a single cavity of minimum size is most readily appreciated in a cavity of this type. It is emphasized, however, that the use of the type of coupling here discussed is not limited to spherical cavities. Coupling loops can be employed for filters in any cavity which will support degenerate modes. In connection with the additional cross couplings between non-successive modes it is obviously not necessary that it be the input and output modes that are cross-coupled; it should be clear that the cross-coupling loop can "jump" one or two intermediate modes in the cascade as well as three. If some degree of cross-coupling is desired at all times it is not even necessary that it be orthogonal fields that are used to effect the cross-coupling, although it is usually preferable because of the ease of establishing zero cross-coupling when this is desired.

The two embodiments of the invention here discussed are therefore not to be considered as exhausting the possibilities of the invention, but merely as demonstrative of the technique employed; the illustrations are not intended to imply any limitations upon the scope of the invention except as such limitations are expressed in the following claims.

What is claimed is as follows:

1. A microwave filter comprising a cavity resonator adapted to respond to a plurality of degenerate modes, an input transmission line, means for coupling said input line to excite said cavity at one only of said degenerate modes, coupling means within said cavity for exciting a plurality of additional degenerate modes in cascade, said coupling means including at least one conductive loop of small diameter in comparison to the dimension of said cavity projecting inwardly from the wall thereof with its plane at an angle of $\pi/4$ radians to the direction of the magnetic field of one of said modes and at a location where said magnetic field is at substantially a maximum, an ouput transmission line and means for connecting said output line to the final degenerate mode of those coupled in cascade, and means for introducing a variable coupling between non-successive modes of those so coupled comprising a second conductive loop projecting inwardly from the wall of said cavity at a location where the magnetic fields of the modes to be coupled are substantially orthogonal and means for rotating the plane of said second loop relative to said orthogonal magnetic fields.

2. A microwave filter in accordance with claim 1 wherein said second loop is positioned to couple the modes coupled to said input and output transmission lines respectively.

3. A microwave filter in accordance with claim 2 wherein the cavity within said resonator is substantially spherical.

4. A microwave filter comprising a cavity resonator adapted to respond to a plurality of degenerate modes, an input transmission line, means for coupling said input line to excite said cavity at one only of said degenerate modes, coupling means within said cavity for exciting a plurality of additional degenerate modes in cascade, said coupling means including at least one probe projecting into said cavity at a point of maximum electric field and at least one conductive loop of small diameter in comparison to the dimension of said cavity projecting inwardly from the wall thereof with its plane at an angle of $\pi/4$ radians to the direction of the magnetic field of one of said modes and at a location where said magnetic field is at substantially a maximum, an output transmission line and means for connecting said output line to the final degenerate mode of those coupled in cascade, and means for introducing a variable coupling between non-successive modes of those so coupled comprising a second conductive loop projecting inwardly from the wall of said cavity at a location where the magnetic fields of the modes to be coupled are substantially orthogonal and means for rotating the plane of said second loop relative to said orthogonal magnetic fields.

References Cited in the file of this patent

UNITED STATES PATENTS

| | | |
|---|---|---|
| 2,232,179 | King | Feb. 18, 1941 |
| 2,357,314 | Carter | Sept. 5, 1944 |
| 2,420,354 | Carter | May 13, 1947 |
| 2,528,387 | Niessen | Oct. 31, 1950 |
| 2,603,754 | Hansen | July 15, 1952 |
| 2,632,808 | Lawson et al. | Mar. 24, 1953 |
| 2,668,191 | Cohn | Feb. 2, 1954 |

FOREIGN PATENTS

| | | |
|---|---|---|
| 990,748 | France | June 1951 |